United States Patent Office 3,268,295
Patented August 23, 1966

3,268,295
ALUMINA HYDRATE AND ITS METHOD
OF PREPARATION
Bernard F. Armbrust, Jr., Benton, Val G. Carithers and Kizhakke G. Hrishikesan, Little Rock, and Harold L. Drown, Benton, Ark., assignors to Reynolds Metals Company, Richmond, Va., a corporation of Delaware
No Drawing. Filed Oct. 6, 1961, Ser. No. 143,305
7 Claims. (Cl. 23—141)

This invention relates to a novel hydrate of alumina characterized by small crystallite size and unusual surface activity. More particularly, the invention concerns alumina hydrate having typically 1.4 to 1.6 mols of water of hydration, very high specific surface area (300 to 600 square meters per gram), and an average crystallite size from 20 to about 40 angstrom units. The invention further relates to methods of producing such alumina hydrate by the rapid carbonation of sodium aluminate solutions.

The industrial demand of high surface area fillers and pigments has led to the development of several forms of relatively high specific surface area aluminas. These are either alumina trihydrates or alumina monohydrates, or in some instances alpha alumina, and the smallest particle size of the commercially available products has been usually between about 0.5 and 1.0 microns. There has been lacking, however, an alumina hydrate of high surface activity in the form of discrete particles of very small crystallite size. This type of material is useful for such applications as reinforcing agents and cure accelerators in rubber, fillers and reinforcing agents in plastics, coatings and fillers for high grade paper, raw material for catalysts, catalytic supports and desiccants, particular pigments, waxes and polishes, ceramics, and cements.

Prior art methods of preparing relatively finely divided, high surface area aluminas have generally involved the precipitation of alumina gel from aluminum salts (such as the chloride and nitrate) with ammonia, followed by complicated methods of aging, washing, and drying to convert the gel thus obtained into a crystalline hydrate phase. However, these processes yielded either the trihydrate or the monohydrate, and the final particles were always comparatively coarse, since it was not possible to retain resulting crystals in a discrete form.

The products of this invention exhibit unusually large specific surface area, while being further characterized by substantially non-porous particles of very small size. These particles are typically produced as loosely held aggregates which can be easily broken down to their ultimate discrete particles. The X-ray diffraction pattern of this alumina hydrate is very similar to boehmite (as represented by ASTM data card 5–0190); and the crystallite size, as calculated from the X-ray data, is in the range from 20 to about 40 A. units. Unlike well-crystallized boehmite, however, which on progressive dehydration passes through gamma, delta, theta, and, finally, into alpha alumina, the alumina hydrate of this invention passes into an amorphous phase, then to eta and, finally, to alpha alumina. In addition, although the alumina hydrate of this invention would be classified as boehmite in crystal structure, it is not stoichiometric boehmite since the mol ration of $H_2O$ to $Al_2O_3$ is not 1.0, but falls in the range of 1.4 to 1.6.

Another important characteristic of the products of this invention is their unusual surface activity. The dried products are superior to "activated aluminas" in their capacity for water adsorption. Furthermore, the adsorbed water can be readily desorbed at 100–110° C. This material also has the ability to form surface esters with organic compounds having at least one hydroxyl group. Depending on the organic group, such coatings characteristically render the product organophyllic, hydrophobic, or hydrophyllic.

In the processes of the invention, broadly, a sodium aluminate solution is decomposed by carbon dioxide in at least stoichiometric proportion to precipitate an easily filtrable aluminum hydroxide gel. The filtered gel is then washed, reslurred with water, and aged at controlled temperature and pH to develop the crystalline alumina hydrate of this invention having a mol ratio of $H_2O$ to $Al_2O_3$ in the range of 1.4 to 1.6. The alumina hydrate is filtered and washed, and the filter cake itself is one of the products of this invention. Several desirable products of this invention are prepared by the various techniques used in drying the aqueous filter cake. In a preferred aspect of the invention, the aqueous filter cake is dried by replacing the water in it with an organic solvent such as acetone, and heating to remove the solvent. The dried product is a light, fluffy alumina hydrate of high specific surface area and low bulk density.

THE ALUMINA STARTING MATERIAL

The sodium aluminate solution used in the process may be obtained conveniently by three different methods (1) by digestion of bauxite with caustic soda solution as carried on in the conventional Bayer process, (2) by leaching an alumina-lime-soda sinter with dilute caustic soda solution as in the conventional lime-soda sinter process, or (3) by digestion of Bayer hydrate with a recycled caustic soda solution obtained by causticizing with lime the sodium carbonate solution from the precipitation step in the process of this invention. Since many products of this invention may be used in low priced, large volume applications, the alumina starting material should be inexpensive and it is with this object that the above three sodium aluminate solutions are chosen for the process of this invention as being the easiest and most inexpensive to make. It should be understood, however, that the process is not limited to any particular sodium aluminate solution or mode of its preparation.

The pregnant Bayer or Bayer-sinter sodium aluminate solutions are highly supersaturated with respect to alumina at ambient temperature, but auto-precipitation of alumina will not ordinarily take place on storage for a few hours since sufficient silica is present (typically 0.2 to 1 g.p.l. $SiO_2$) to provide stabilization. It is extremely important, however, that the sodium aluminate solution selected for the process of this invention should be such that no auto-precipitation has set in; otherwise, the precipitated alumina hydrate will act as a seed in the carbonation step of the process and less of the desired alumina hydrate of this invention will be produced.

Sodium aluminate solution from the Bayer or Bayer-sinter operation having the $Al_2O_3$ to free soda ratio in the range of 0.5 to 0.7 is ordinarily stable enough for use as the preferred starting alumina material of this invention. At alumina/free soda ratios higher than about 0.7, the sodium aluminate solution is highly unstable unless auto-precipitation is prevented by silica, sodium tratrate or other well known stabilizing agents. Such stabilized sodium aluminate solutions can also be used as the starting alumina material for this invention, provided the content of stabilizing agent is not so excessive as to interfere with precipitation upon acidification of the solution. Similarly, auto-precipitation can be deterred by cooling sodium aluminate solution to freezing temperature. If the $Al_2O_3$ to free soda ratio is less than 0.50, the solution can still be used for the process of this invention, but comparatively larger amounts of carbon dioxide per unit of alumina are required for the subsequent carbonation step. From an economic standpoint, such low ratio sodium aluminate solutions are undesirable for this process.

Sodium aluminate solutions from the Bayer or Bayer-sinter processes used for the alumina hydrate precipitation usually have a free soda content of 100 to 170 g.p.l. The term "free soda" is used to represent the sodium carbonate equivalent of caustic soda present in solution both as free caustic and in combination with alumina as sodium aluminate. In addition to the caustic soda (both free and combined) there is usually present some free sodium carbonate in the sodium aluminate solutions. The free sodium carbonate content varies depending on the source of the sodium aluminate solution. Thus, in the usual Bayer sodium aluminate solution the ratio of free soda (i.e. caustic soda expressed as $Na_2CO_3$) to total soda (i.e. free soda plus dissolved sodium carbonate) may vary from 0.7 to 0.85. This ratio may be as high as 0.9 in sodium aluminate solutions from lime-soda sinter process and almost 1 in synthetic sodium aluminate solutions prepared by digesting alumina trihydrate with caustic soda. For the process of this invention, it is necessary to have the total soda in the sodium aluminate solution well within the saturation limit of sodium carbonate in that solution. If the total soda exceeds the saturation limit, sodium carbonate will be precipitated in the carbonation step along with the aluminum hydroxide and contaminate the product of this invention. Even though aluminum hydroxide could be precipitated from sodium aluminate solution having the aforementioned $Al_2O_3$ to free soda ratios and containing about 200 g.p.l. total $Na_2CO_3$, the resulting slurry would be so viscous as to give rise to practical difficulties in separating the precipitate from the mother liquor. Therefore, depending on the source of sodium aluminate solution, it has to be diluted with water so that the final total soda content is sufficiently below about 200 g.p.l. $Na_2CO_3$ to produce an easily filterable slurry following precipitation. In a preferred process of this invention using sodium aluminate solution from lime-soda sinter operation, two parts of the sodium aluminate solution are diluted with one part of water so that the final total soda is about 80 g.p.l. $Na_2CO_3$. It should be noted that while the total soda must be well within the saturation level of sodium carbonate, there is no lower level of dilution detrimental to the process of this invention. It is only for economic reasons that dilution is kept within practical levels, in order to reduce the evaporation load in the subsequent treatment of the mother liquor obtained from the precipitation of aluminum hydroxide.

CONDITIONS OF CARBONATION

Decomposition of sodium aluminate solution with $CO_2$ to precipitate aluminum hydroxide is generally known in the prior art. Thus, if $CO_2$ is passed over sodium aluminate solutions at 80° C. slowly and intermittently for four to thirteen days, it is said that the aluminum hydroxide produced is the crystalline alpha alumina trihydrate, or gibbsite; and if the precipitation takes place in 3 to 6 hours, that the alumina hydroxide produced is the crystalline beta alumina trihydrate, or bayerite. By carrying out the carbonation in one-fourth hour at room temperature and then aging the precipitated aluminum hydroxide for one month at 75° C., the resulting product has been reported to be a mixture of boehmite and pseudoboehmite. In this sense, the term "pseudoboehmite" is used with reference to alumina hydrate having 2–3 mols of water of hydration.

It is evident from the state of the prior art that the decomposition of sodium aluminate solution by $CO_2$ is not a simple precipitation of aluminum hydroxide, and various results are obtainable, dependent upon several variables.

In the carbonation step of the process of this invention, it is preferred to use a slight excess over the stoichiometric quantity of $CO_2$ in the gaseous form. The stoichiometric quantity of $CO_2$ is that which will be necessary to completely neutralize the "free soda" in solution, the "free soda" being the caustic soda present as free NaOH and in combination with alumina as sodium aluminate. If less than a stoichiometric quantity of $CO_2$ is used in the carbonation step, it is noted that the precipitated alumina hydroxide acts as a seed and further precipitation takes place rapidly by hydrolysis of the yet undecomposed sodium aluminate on the surface of the seed. Such a precipitated aluminum hydroxide is not the precursor material for the product of this invention, since on further treatment it produces the crystalline alpha or beta trihydrates. Use of $CO_2$ very much in excess of the stoichiometric quantity does no harm, but serves no useful purpose. Since $CO_2$ absorption is not always 100% efficient, it is found that if $CO_2$ addition is 10–20% in excess of the stoichiometric quantity, well above 90% recovery of alumina can be achieved.

The reaction of unstabilized and substantially pure sodium aluminate solution with $CO_2$ proceeds in two steps, first the neutralization of the uncombined NaOH in solution to form sodium carbonate and second the decomposition of sodium aluminate to form sodium carbonate and aluminum hydroxide. It is an important aspect of this invention that the precipitation of aluminum hydroxide be accomplished entirely through the agency of neutralization rather than hydrolysis of the sodium aluminate. As the uncombined NaOH is neutralized, the $Al_2O_3$/free soda ratio rapidly rises, making the sodium aluminate solution even more unstable and thereby creating undesired conditions favoring auto-precipitation of aluminum hydroxide. The term "auto-precipitation" is used herein with reference to decomposition of the sodium aluminate by hydrolysis rather than by neutralization, to precipitate aluminum hydroxide from which the product of the invention is not attainable upon the prescribed further processing. In the carbonation step of this invention, auto-precipitation is prevented by maintaining a rate of neutralization faster than the rate of auto-precipitation. Hence as rapid a rate of neutralization as practicable is desired to precipitate a precursor aluminum hydroxide which, on subsequent processing, gives the products of this invention. It is found that sufficiently rapid carbonation is achieved (even without stabilization) if all the alumina in solution is precipitated within about 20 minutes. Correspondingly, a carbonation period of less than 2 minutes is undesirable because the ultimate product has a surface area approaching the lower limit of that property. The preferred period for carbonating substantially unstabilized solutions is 5 to 10 minutes, to develop a product having the maximum surface area. If the sodium aluminate solution is stabilized sufficiently, however, a period of an hour or more is not excessive for completing carbonation. For example, such a solution (75 g.p.l. free soda and 0.63 ratio $Al_2O_3$/free soda) having a silica content of about 0.4 g.p.l. $SiO_2$ was successfully carbonated within 50 minutes.

To achieve the stoichiometric absorption of $CO_2$ at a sufficiently rapid rate, the $CO_2$ may be dispersed into the body of the sodium aluminate solution by means of a high speed impeller, thereby dispersing the $CO_2$ into tiny bubbles and achieving a high gas to liquid inerfacial area.

The sodium aluminate solution before carbonation shows a pH of around 13 as measured by Model H-2 Beckman glass electrode pH meter. As carbonation proceeds, the pH drops rapidly and the aluminum hydroxide begins to precipitate at a pH of around 11. If the aluminum hydroxide precipitate could be removed from the main body of the liquor as soon as it is formed, the precursor material for the product of this invention would be obtained. But any normal separation step such as filtration or centrifuging will give some contact time between the precipitate produced by neutralization and the partially decomposed sodium aluminate mother liquor. This short contact time is found to be sufficient to cause hydrolysis in the mother liquor, with consequent formation of an undesirable precursor gel and ultimately less of the desired product of this invention.

As the carbonation is continued in the preferred process of this invention, the pH drops further and it is found that when a stoichiometric amount of $CO_2$ has been reacted the desired precursor aluminum hydroxide is obtained and the pH is about 10.5. At this pH value, about 90% of the alumina has been precipitated from the solution and there is very little danger of auto-precipitation during the separation of the precipitate from the mother liquor. It should be noted that the pH is used only as a control for the carbonation step, and should not be taken to mean only that $CO_2$ is added until a pH of 10.5 is reached when other conditions such as time of carbonation, quantity of $CO_2$, and prevention of auto-precipitation are not satisfied.

While the precipitation step of this invention has been discussed with regard to $CO_2$ as the neutralizing agent, other acid materials such as HCl, $H_2SO_4$, $HNO_3$ or $NaHCO_3$ will produce an aluminum hydroxide by their reaction with sodium aluminate solution. However, such neutralizing agents have one or more of the following disadvantages: (1) they are more expensive than $CO_2$; (2) the resulting sodium salts cannot conveniently be re-used for producing caustic soda and the neutralizing agent by comparatively inexpensive methods; (3) the aluminum hydroxide produced is usually contaminated with anions such as Cl, $SO_4$ or $NO_3$ which cannot readily be washed out to produce a pure aluminum hydroxide precursor material. The $CO_2$ used in the carbonation step can be pure $CO_2$ gas or purified flue gas. To the extent that the $CO_2$-containing gas has other compoents, the only limitation on its use is that the non-$CO_2$ components should be chemically inert to sodium aluminate or the products of carbonation.

Another important variable in the carbonation step which determines the proper precursor aluminum hydroxide is the temperature at which the carbonation is carried out, which should be between 25 and 60° C. It is found that under the other conditions specified for the carbonation step, if the temperature exceeds 60° C. the alumina hydroxide formed will on further treatment give rise to development of alpha and beta alumina trihydrate. In addition, the latter aluminum hydroxide filters much more slowly than the one precipitated in the temperature range of 25 to 60° C.

Another significant departure from prior art in this invention is based on the discovery that there is a relationship between the temperature and the time of contact of the precipitated aluminum hydroxide with the mother liquor. Thus, the aluminum hydroxide precipitate can be stored in the mother liquor at 25° C. for as long as 2 days without undergoing any change detrimental to the development of the crystalline alumina hydrate of this invention. At the higher limit of precipitation temperature it is found that the stability of the resulting aluminum hydroxide will be adversely affected if stored in the mother liquor for more than about 2 hours. It is necessary, therefore, for the proper development of the crystalline alumina hydrate of this invention, that the aluminum hydroxide from the carbonation step be removed from the mother liquor within the time specified after carbonation is completed. Permissible storage time in the mother liquor, if it is found to be necessary to store the precipitate, will vary as indicated above depending on the temperature of carbonation.

It should be noted that the aluminum hydroxide precipitated in the carbonation step of this invention is an amorphous gel and not a crystalline alumina hydrate. If detectable crystallinity develops during the carbonation step, furthermore, the precursor alumina hydroxide gel is not formed as required in the practice of this invention.

The aluminum hydroxide gel of this invention is easily differentiated from the alumina hydrogel which is prepared by neutralization of aluminum salts with ammonia (as discussed in U.S. Patent 2,838,375) at a pH between 7 and 10, by its easy filterability and fluffiness. The hydrogel of the type prepared from aluminum salts and ammonia is more difficult to filter and is slimy. Moreover, as the hydrogel is reslurried in water and then filtered, the filtration rate becomes extremely slow as the anion concentration in the hydrogel is lowered.

The carbonation step of this inventon is also different from the process described in U.S. Patent 2,247,624, wherein a partial decomposition of sodium aluminate solution is accomplished by gassing with $CO_2$ and the precipitated aluminum hydroxide is aged in the mother liquor. It is found that the desired precursor aluminum hydroxide gel is not formed in the patented process referred to since the stated conditions are best suited to cause auto-precipitation, which is wholly detrimental to this invention.

AGING

The precipitated aluminum hydroxide from the carbonation step is filtered and washed, preferably with three displacement washes using 175° F. water. This washing step is important insofar as its efficiency determines the pH of the aqueous suspension used for the aging step. Ordinarily, three displacement washes are sufficient that the filter cake, when reslurried to form a 5–10% solids aqueous suspension, gives a pH in the required range of 8–9. Even with the most efficient washing, the pH will not be significantly lower than 8. If the washing has been insufficient, however, the pH of the aqueous suspension may be as high as 10 or more, and the products of this invention will not ultimately be formed with the desired range of properties unless the pH is first reduced to the required range. The washed aluminum hydroxide gel usually has an $Na_2O$ content ranging from 1% to as high as 5%. It is important for the successful practice of this invention that the washed filter cake at this stage does not contain gibbsite or bayerite. The presence of these crystalline trihydrates (previously discussed as resulting from auto-precipitation) indicates unsatisfactory carbonation and renders the further removal of such soda extremely difficult.

The washed filter cake of the aluminum hydroxide precursor gel typically has a 20% solid content and is slurried with sufficient water to make an aqueous suspension of 5–10% solids. The suspension is fully dispersed by agitation. The purpose of reslurrying is only to render the cake fully dispersed. The aqueous suspension is then aged at a preferred temperature of about 200° F. for a time period of 5 to 90 minutes (typically about 30 minutes). Under these conditions a crystalline alumina hydrate of the invention having 1.4 to 1.6 mols of $H_2O$ per mol of $Al_2O_3$ is developed, with a crystallite size of 20 to about 40 A. If such aging is continued much longer than 90 minutes, the crystallite size may exceed the specified range and the alumina hydrate will exhibit correspondingly reduced surface area, as well as becoming much more difficult to filter. The temperature of aging has no significant effect on the product of this invention except to change the time required for the proper crystalline phase to develop. For example, at 75° F. the aging process has to go for hours or even days before the proper crystallinity can be developed. It is preferable, however, that the aging temperature be no greater than about 212° F.

It is found that by developing the desired crystalline phase and crystallite size, the soda in the alumina hydrate can readily be reduced to as low as 0.01% $Na_2O$ with only two displacement washes. An important aspect of the invention is this easy removal of soda. According to prior teaching, several different alumina hydrate phases can be formed under varying conditions of aging. But none of these alumina hydrates will give a soda content as low as 0.01% $Na_2O$ without excessive washing. For example, one of the prior art products of such aging is bayerite and only with a long washing period extending to several days and using copious amounts of water can the soda be reduced even to about 0.05% $Na_2O$.

Another important aspect of this invention is that on continued aging for several days the product becomes progressively a true monohydrate. Thus, if a true amorphous aluminum hydroxide gel is produced as specified under the proper conditions of carbonation, the aging step involves the rapid development of the crystalline phase of this invention, which is comparatively stable and which is changed to boehmite on prolonged aging without further transformation to bayerite or gibbsite.

The aged alumina hydrate is filtered and given two displacement washes with water to produce the basic products of this invention.

DRYING

By employing various methods of drying, the basic product of this invention obtained in the aging step can be modified in physical properties to suit various uses. For example, the washed filter cake can be either (a) dried in a shelf or rotary drier at a temperature not exceeding 220° F., and the dried product pulverized to produce substantially coarse particles in the plus 44 micron size range; or (b) reslurried in water, dried at 220° F. on a drum drier and pulverized to produce particles substantially finer than 44 micron size; or (c) reslurried in water and spray dried at 220° F. to produce a fluffy product of 15–20 lbs./cu. ft. bulk density. Depending on the slurry consistency and the atomizing conditions, material of still lower bulk densities can be made.

The above-mentioned air dried products are characterized by a $H_2O/Al_2O_3$ mol ratio of 1.4 to 1.6, but their surface areas will be in the order of 300–400 sq. meters/gram, which is in the lower range of this property for the product of the invention. A much better deagglomeration of the product is obtained by drying the washed filter cake from the aging step by first displacing the water by a volatile organic solvent such as acetone. The organic solvent should not contain functional groups like hydroxy, carboxy, halogen or aldehyde that will give rise to surface esterification of the product, and is preferably either completely or at least partially miscible with water. Such organic solvents can be liquid aliphatic or aromatic hydrocarbons, ethers, ketones and the like, or mixtures of these, provided they do not have the abovementioned reactive functional groups. The filter cake from the aging step is given a displacement wash with acetone and the cake then dispersed in more acetone to give a 15% solid suspension. The acetone slurry is filtered and the filter cake is dried at 200° F. The dried cake is fluffed up in a blender to give a product having a bulk density of 3–5 lbs./cu. ft. and surface area in the 400–600 sq. meters/gram range. A similar product is made by employing freeze drying wherein the washed filter cake from the aging step is frozen at 30° F. and the ice sublimed under vacuum.

If surface esterified products are desired, the water from the filtered cake is displaced with the chosen liquid organic compound. For example, a product surface esterified with isopropyl groups is produced by washing with isopropyl alcohol, dispersing the cake in more isopropyl alcohol, filtering and drying the wet cake at about 100° C. for several hours. Such a product will contain 2 to 4 isopropoxy molecules per square millimicron of surface area.

If the alumina hydrate is desired to be surface esterified with fatty acids such as stearic acid, an acetone washed cake from the aging step is dispersed in an acetone solution of stearic acid. The stearic acid is immediately taken up from the solution by the alumina hydrate. The slurry is filtered and dried. Such fatty acid, surface esterified product will contain 2–4 fatty acid molecules per square millimicron of surface area. The product does not show the X-ray pattern for stearic acid or aluminum stearate, nor does it give evidence of the low melting point of stearic acid, indicating that the stearic acid is coated as a thin film of molecular dimension on the surface of the hydrate.

PROPERTIES OF THE PRODUCTS OF THIS INVENTION

A general description of some of the characteristic properties of the products of this invention has been previously given. But a more detailed description of these properties will further differentiate the products of this invention from those known in the prior art.

1. Mol ratio of $H_2O$ to $Al_2O_3$

One of the most significant properties of the product of this invention is that it has a mol ratio of $H_2O$ to $Al_2O_3$ specifically in the narrow range of 1.4 to 1.6. Accordingly, although the product exhibits an X-ray pattern similar to that of boehmite, it is readily distinguished from the latter which has a mol ratio of one. This is determined by first drying the material to constant weight at 110° C to drive off free or adsorbed moisture. A known weight of the dried product is then heated in a platinum crucible at 1000° C. for 3 hours or until constant weight is obtained, the loss in weight representing the bound water. The alumina content of the dried material is determined by any of the well known methods such as with 8-hydroxyquinone. From the known percentage compositions of water and alumina their molar proportions can then be calculated. The only assumption in using this method is that the only volatile constituent in the product is water, and for the general products of this invention the assumption holds true, since the alumina hydrate is an extremely pure form. In the case of surface treated products, the loss in weight has to be corrected for the other volatiles that are associated with the alumina.

2. X-ray diffraction pattern

As shown by the data in Table I, the products of this invention exhibit an X-ray diffraction pattern similar to that of boehmite. The X-ray patterns were determined on a Norelco X-ray diffractometer with wide range goniometer, connected to a Brown recorder, using copper K$\alpha$ radiation, and a nickel filter.

TABLE I

| "d" spacing in angstroms: | Intensity, $I/I_0$ |
|---|---|
| 6.32 to 6.50 | 100 |
| 3.17 | 57 |
| 2.35 | 43 |
| 1.84 | 64 |
| 1.65 | 7 |
| 1.43 | 7 |
| 1.31 | 18 |
| 1.17 | 10 |

The diffraction pattern of boehmite used for identification was ASTM diffraction data card 5–0190. Instead of sharp, smooth diffraction peaks as would be characteristic of well-crystallized boehmite, the peaks obtained were broad and diffuse with most of the minor peaks missing. Crystallite size was determined by measurement of line broadening at half intensity. The average crystallite size from such measurement for the products of this invention was found to be typically 20–40A.

In addition, the area under the 28.1°, $2\theta$ diffraction peak was compared to the corresponding area of a standard boehmite material and found to fall within the range of 40 to 90% of the boehmite area. It appears that a product of optimum properties generally exhibits a ratio of about 70–80%. Hereafter, the term "boehmite content" will refer to the above defined area proportion.

3. Surface area and particle size

Another unique property of the products of this invention is their unusually large surface area which is in the range of 300 to 600 sq. meters/gram. In contrast, the alumina trihydrates of the finest particle size have surface area considerably below 50 sq. meters/gram. By controlled thermal dehydration, the alumina trihydrates can be converted to transition aluminas having surface areas in the order of 300–400 sq. meters/gram. But these transition aluminas are entirely different from the products of this invention, since their X-ray patterns are not similar to boehmite and they usually have no more than 0.5 mol of $H_2O$ per mol of $Al_2O_3$.

Naturally occurring boehmite or synthetic boehmite produced by the hydrothermal conversion of gibbsite usually has a surface area in the order of 10 sq. meters/gram. Such boehmite is well crystallized, shows sharp, well-defined X-ray diffraction peaks, has crystallites in size range of 60 A. and above, and has a $H_2O/Al_2O_3$ mol ratio of 1 to 1.2.

Another class of boehmite, fibrous in shape, is disclosed in U.S. Patent 2,915,475 as having a surface area in the range of 200 to 400 sq. meters/gram. Unlike the products of this invention, which are prepared by controlled precipitation and aging of aluminum hydroxide gels, the fibrous boehmite of the above reference is a product of hydrothermal conversion of basic aluminum salts. The fibrous boehmite, unlike the product of this invention, is easily dispersed in water forming colloidal solution of alumina.

Surface area is determined by the well known Brunauer-Emmett-Teller method using nitrogen. The average particle diameter is determined from the surface area measurements using the following formula.

$$\text{Particle diameter in millimicrons} = \frac{6 \times 10^3}{S.A. \times D}$$

where $S.A.$ = surface area in sq. meters/gram and $D$ = absolute density in grams/ml.

For the basic product of this invention the absolute density is found to be about 2.66 g./ml. and particle diameters are in the range of 3 to 10 millimicrons. The absolute density of the surface esterified material will vary depending on the organic component. Due to the highly charged surface of the product of this invention, it cannot be permanently dispersed by ordinary methods and the electronmicrographs show only the agglomerated particles which are several fold greater than the individual particles. However, by rubbing between the fingers or by application of slight shearing pressure, these agglomerates break down into the ultimate particles.

4. Bulk density

Loose bulk density of the product of this invention varies depending on the method of drying. Thus, a pulverized spray dried or drum dried material usually has a bulk density of 15 to 20 lbs./cu. ft., while acetone dried material which is more deagglomerated has a bulk density of 3 to 5 lbs./cu. ft. An even lower bulk density can be achieved if the drying is similar to that of well known aerogel manufacture wherein the liquid phase is removed at its critical temperature.

5. Pore volume and pore diameter

The pore volume was determined by the method of Barrett et al., JACS, 73, 373 (1951). The pore volume of the product of this invention varies from 0.35 to 0.80 cc./gm. A pore size distribution calculated from the data obtained from the above method, showed that most of the pores of the products of this invention are in the range of 20 to 300 A. It should be noted that the pores measured by this method are the micropores created in the random packing of ultrafine and substantially nonporous particles.

6. Oil absorption

Using the ASTM oil absorption method D281–31, the product of this invention gave an ASTM oil absorption of 150 to 340 lbs. of linseed oil/100 lbs. of material depending on the drying technique involved. This test further confirmed the fineness of the particles.

7. Refractive index

The refractive index of the product of this invention is in the range of 1.606 to 1.614.

8. pH

A 4% aqueous suspension of the product of this invention gives a pH of 8 to 9, as measured by the Beckman pH meter Model H–2 with a glass electrode as the indicator electrode. Moreover, the pH has been found not to vary significantly with the percent solids in suspension.

9. Chemical purity

A unique property of the product of this invention is its extreme chemical purity. Normally alumina hydrates prepared from sodium aluminate by precipitation with $CO_2$ contain $Na_2O$ in the range of 0.3–0.5%. It is only upon copious washing with water that such soda contamination can be reduced to 0.10% $Na_2O$. Following only moderate washing, the products of this invention are characterized by low soda content of less than 0.02% $Na_2O$.

10. Surface esterification

The unique surface activity of the products of this invention can be demonstrated by the ease with which organic monohydric alcohols or aliphatic fatty acids form surface esters. The following method is illustrative of surface esterification with an organic monohydric alcohol. The basic product of this invention after the aging step is washed with isopropyl alcohol to displace the water, reslurried in isopropyl alcohol, filtered to remove the excess alcohol, and then dried. During the drying the reaction between the alcohol and the alumina hydrate of this invention takes place, giving rise to a product having 2 to 4 molecules of isopropyl alcohol per square millimicron of surface area.

The amount of isopropyl alcohol reacted is determined by analyzing the product for total carbon. From the carbon content, the equivalent isopropyl alcohol is calculated. It may be noted that the surface esterified product on X-ray examination does not show the presence of isopropyl alcohol or aluminum isopropoxide, but gives only the characteristic X-ray pattern of the original product of this invention. It is evident that the isopropyl alcohol is present on the surface in thicknesses much below the dimension discernable by X-ray analysis.

The following method is illustrative of the surface esterification with an aliphatic fatty acid. The basic product of this invention from the aging step is given a displacement wash with acetone and then the filter cake is well dispersed in acetone. A solution of stearic acid in acetone is then added and mixed well. Then the mixture is filtered and the filter cake is reslurried in warm acetone to remove any physically adsorbed stearic acid.

The dried product contains stearic acid in the range of 2 to 4 molecules of stearic acid per square millimicron surface area. An X-ray examination of the product does not reveal stearic acid or aluminum stearate but gives only the X-ray pattern of the original unesterified alumina hydrate, indicating that the surface coating of stearic acid is of such thickness much below the dimension discernable by X-ray analysis.

The stearic acid is determined by analyzing for the total carbon content and calculating the equivalent of stearic acid content of the product.

It may be noted that these surface esterified products retain the surface area of the original alumina hydrate and are stable above the temperature at which the alcohol boils or the fatty acid melts. It is previously unknown to make such esterified alumina products at low temperatures and at atmospheric pressure.

11. Sorptive property

Another characteristic property of the product of this invention is its ability to sorb water vapor. A spray dried product of this invention at 10% relative humidity sorbs about 6% of its weight of water, while at 80% relative humidity it sorbs about 28% of its weight of water. An acetone dried product sorbs about 6% of its weight of water at 10% relative humidity, while at 80% relative humidity it sorbs about 43% of its weight of water. This sorptive property has hitherto been known only for activated aluminas, which are essentially transition products produced by the thermal decomposition of alumina hydrates. The sorbed water on the products of this invention can be desorbed by simply drying at 200–220° F. while for activated aluminas the desorption temperature is in the order of 400–600° F. It is further noteworthy that repeated sorption and desorption of water vapor by the products of this invention does not alter its sorptive capacity.

12. Thermal decomposition of the product

On heating the products of this invention in the presence of water in a bomb at a temperature of about 160° C. to 200°, a well-crystallized boehmite is produced. This boehmite is characterized by a lowering of the surface area to the order of 100 to 200 sq. meters/gram and by crystallite sizes well in excess of 60 A.

On heating the products of this invention in air, the surface area increases to a maximum and then gradually drops to less than 10 square meters/gram as the product turns into alpha alumina at a temperature of about 1100° C. The only crystalline alumina phase formed during the thermal transformation is that of so-called eta alumina which begins to appear at a temperature around 600° C. and persists till about 1000° C.

The adsorptive property of the thermally treated product of this invention can be much higher than the original product. Thus, an acetone-dried product (which adsorbs 43% of its weight of water at 80% relative humidity) adsorbs 53% of its weight of water at that relative humidity when the product is first heated for 2 hours at 590° C. and then used for water adsorption.

13. Solubility in dilute HCl

Unlike well crystallized boehmite, the product of this invention is more soluble in dilute hydrochloric acid. The solubility was determined as follows:

Based on $Al_2O_3$ weight (and the reaction

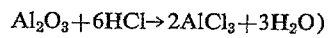
$$Al_2O_3 + 6HCl \rightarrow 2AlCl_3 + 3H_2O)$$

0.5432 N HCl was added to the sample contained in 125 ml. flask so that 110% of the theoretical HCl was present. The flask with the mixture was shaken 1 hour and 15 minutes on a Burrell wrist action shaker. The slurry was transferred to a 250 ml. beaker, the total volume brought to 125 ml. with distilled water and stirred with a magnetic stirrer for 15 minutes. The stirring was continued while the slurry was titrated potentiometrically with 0.4758 N NaOH. By plotting the pH of titration against ml. NaOH used, the dissolved alumina was calculated. By this method, it was found that about 15% of the alumina in the product of this invention dissolved in 0.5432 N HCl at about 25° C. Under the same conditions, no alumina was found to dissolve when regular well crystallized boehmite was used. Less than 1% alumina dissolved when a finely divided alumina trihydrate was used.

USES FOR THE PRODUCTS OF THIS INVENTION

There has long been an industrial demand for finely divided, surface active aluminas for a variety of applications. Some of the more important applications in which the products of this invention can be used will be described to show their versatility in satisfying widely varying requirements.

In the rubber industry, the products of this invention finds several uses, such as coagulating agents for latex, as reinforcing agents for natural and synthetic rubber to improve mechanical properties, as inert fillers and as coloring agents.

The product of this invention, obtained as a wet filter cake from the aging step, has an important advantage over other fillers because of its ability to coagulate latex without the use of the usual coagulants. Thus, when the filter cake is added to SBR–1500 latex in proportion of 15 volumes of the solid content of the filter cake to 100 volumes of latex, and mixed, the alumina and the latex coprecipitate in less than two minutes. Such alumina-latex preparations can be further processed to produce polymers of outstanding electrical properties. In contrast, the acid or salt coagulants usually used for latex coagulation leave residues which have deleterious effects on the electrical properties of the polymer.

An acetone dried product of this invention, when dry milled into SBR–1500 in the proportion of 65 parts by weight of alumina to 100 parts by weight of the polymer, gave a vulcanizate which showed a tensile strength in the order of 3000 p.s.i., a tenfold increase as compared to SBR–1500 vulcanizate with no reinforcing agent. A similar increase in tensile strength of the polymer was noted when a stearic acid coated product of this invention was used.

The ability of the product of this invention to sorb organic dyes can be used in producing colored rubber compositions. Thus, an organic dye such as alizarin blue is adsorbed from its solution by the product of this invention and the dyed alumina can then be incorporated into the rubber either by coprecipitation with the latex or by drymilling, producing a blue vulcanizate.

Another advantage of the product of this invention is in the pigment field. Aluminum compounds have long been used as mordants in the dyeing of cotton and rayons, especially with anthraquinone dyes (alizarins). These anthraquinone dyes can be used as pigments for lacquers, paints, plastics, rubber resin bonded pigment dyeing and printing. At present, rigid specifications with regards to fastness, tinctorial and physical properties has limited the use of these pigments to the more stable of the mordant and vat dyes. The high cost of anthraquinone dyes has further limited their use and preparation of the dye in the proper form for ease of grinding and brightness of shade is usually difficult. The product of this invention has been successfully reacted on its surface with three of the more stable anthraquinone dyes to give bright colors on the easily dispersed dry solid. Since a major requirement for pigments is that they do not "bleed" into the vehicle, dyed products of this invention leached with linseed oil, acetone, alcohols and water were found to exhibit no such bleeding into the liquid phase. The three pigments made from the products of this invention were blended in either the wet or dry state to give secondary colors in which none of the original colors could be detected. Utilizing the three primary colors and black, essentially the whole spectral color range can be made by mixing the dyed products of this invention. Such permanently colored pigments can be used in plastics, synthetic fibres and non-woven fabrics. Many colors and shades now unavailable in this field can be obtained by the use of dyed products of this invention. These pigments can also be used in interior paints which use oil or water bases. Since the pigments prepared from the products of this invention have low density and are extremely fine, they do not settle out and the paints require only limited stirring before use. These pigments are less expensive than the original organic dyes, and extend the color over a large surface.

Alumina hydrate of this invention can be used in bleaching of vegetable oils. Thus, crude unbleached cottonseed oil, which has a dark brown color, can be heated for 15 minutes at 200° C. with 4 to 10% of its weight of the alumina hydrate to give an oil having a golden yellow color after filtration. Activated aluminas have been found to remove the red coloring compounds in bleached cottonseed oil but, when used in the place of activated alumina, the products of this invention were not only found to remove the red pigment but produced an oil which was 40% "lighter" in color.

Alumina catalyst and catalyst supports have long been manufactured by expensive methods involving precipitation of alumina from aluminum salts or by hydrolysis of aluminum alcoholates. Such alumina materials are free of sodium contamination because no sodium compounds are used in their preparation. The products of this invention, even though produced from sodium aluminate, have extremely low sodium contamination (as little as 0.01% $Na_2O$) and are therefore ideally suited as an inexpensive source for alumina catalysts. The products of this invention on dehydration at about 900° C. produce eta alumina of high surface area and thermal stability.

The products of this invention are easily extruded, forming strong pellets which on dehydration and impregnation with the necessary catalytic materials can be made into a variety of catalysts required in the petroleum refining industry.

Activated alumina is well known as a desiccant. Its ability to adsorb water vapor from gases is, however, low when the relative humidity is about 10%. The products of this invention without any activation, i.e. dehydration to a transition alumina phase, are found to be much more adsorptive than activated aluminas at relative humidities of 10%. Superior adsorptive capacity of the products of this invention is also maintained at higher humidities. Another advantage is that the desorption temperature is only 200–220° F. for the products of this invention, while for activated aluminas this temperature is in the range of 400–600° F.

The adsorptive capacity is further increased by heating the products of this invention at 400–500° C. for 1 hour. Products from such a dehydration are two to three times more adsorptive than activated aluminas produced from alumina trihydrates.

The following examples are illustrative of the invention.

EXAMPLE 1

One liter of a synthetic sodium aluminate solution was prepared in the following manner:

Using a stainless steel 2-liter beaker, 60 grams of NaOH (97% pure) were dissolved in 75 ml. of boiled, demineralized water. Then, 75 grams of gibbsite (designated by Reynolds Metals Company as R-5003F) were added and the temperature of the slurry was raised to boiling. After 15 minutes, a clear solution of sodium aluminate was obtained.

This solution was diluted to 750 ml. and vacuum filtered through a Whatman #52 paper to remove colloidal iron. The filter was washed with boiled, demineralized water and the washings added to the filtrate. The total volume of filtrate was then adjusted to 1 liter with boiled, demineralized water and cooled to 30° C.

Carbon dioxide gas was then added to this liquor through a polyethylene sparger, accompanied by vigorous agitation over a period of 5 minutes. The pH of the resulting slurry was 10.5 and the temperature rose to 110° F.

The slurry was then vacuum filtered, rapidly, through #576 filter paper under which a mat had been built of 2 #30 Whatman papers on a 15 cm. Büchner type funnel. The filter cake was given 3 displacement washes (250 ml. each) of demineralized water at 150° F.

The washed filter cake was reslurried and dispersed in 1 liter of demineralized water at 150° F. by means of a "Homo-Mixer." The temperature of the slurry was raised to 190° F., and maintained at this level for thirty minutes while stirring.

The aged slurry was then vacuum filtered rapidly on a 15 cm. Büchner type funnel using #576 paper under which a mat of 2 #30 Whatman paper had been placed. The cake was given a single 250 ml. displacement wash with boiling demineralized water and this was followed immediately by two 250 ml. acetone displacements.

The resulting cake was then dried at 220° F. for four hours. The dried cake was in the form of soft, easily crushed lumps. These soft lumps were easily broken down by osterizing for 10–20 seconds to give a fine, alumina hydrate having a loose bulk density of 4–7 lbs./ft.$^3$ and a BET (nitrogen adsorption) surface area of 500 m.$^2$/g. Other physical and chemical properties of the dried alumina hydrate were as follows:

1000° C. LOI—21.36%
$Na_2O$—none detected by P-E flame photometer
$Fe_2O_3$—0.002%
$SiO_2$—0.017%
Absolute density—2.65–2.66
Static moisture adsorption at 24 hour equilibrium:
    10% relative humidity—8.10 g. $H_2O$/100 g. sample
    80% relative humidity—35.89 g. $H_2O$/100 g. sample
Refractive index—1.58–1.61
Ultimate crystallite size (X-ray diffraction method of Debye-Scherrer)—26 A. units
Particle diameter (calculated from surface area)—45 A. units
Boehmite content—87%

There were 56 grams of dried product recovered, which represents 92% of the original $Al_2O_3$ in solution.

EXAMPLE 2

A sodium aluminate solution from lime-soda sinter process was used in this example. This liquor analyzed 5.71% $Al_2O_3$, 9.15% free soda, 0.022% $SiO_2$, and had a specific gravity of 1.140. Two parts by weight of the liquor were diluted with 1 part $H_2O$. The other details of this example are identical to Example 1, down to the final filtration. The filter cake was given a displacement wash with 250 ml. of boiling demineralized $H_2O$, which was followed by reslurrying the cake in hot demineralized $H_2O$ (no organic solvents being involved) to give about 5–7% solids in suspension. This slurry was then fed to a spray drier for the production of a partially dried product, which was subsequently dried at 220° F. for analytical purposes.

The spray dried product had a free moisture content of 12–13% (105° C. loss). This product was a free flowing, dry feeling material, even before the further drying indicated.

Chemical properties were the same as in Example 1, but physical properties differed as follows:

BET surface area (nitrogen adsorption)—330–350 m.$^2$/g.
BET pore volume—0.35–0.36 ml./g.
Static moisture adsorption at 24-hour equilibrium:
    10% relative humidity—5–6 g. $H_2O$/100 g. sample
    80% relative humidity—26.28 g. $H_2O$/100 g. sample
Loose bulk density—15–20 lbs./ft.$^3$

EXAMPLE 3

The aged, aqueous filter cake of Example 1 was also dried by freeze drying. A 28.5 g. portion of this cake was spread in a thin layer on a watch glass and frozen in a refrigerator at 28° F. The frozen cake was then placed in a vacuum desiccator over concentrated sulfuric acid and placed under vacuum for 8 hours. The alumina hydrate dried in this manner gave a product similar to the acetone dried material and had a surface area of 310 m.$^2$/g.

EXAMPLE 4

Two liters of a synthetic sodium aluminate solution were prepared in the following manner. Using a stainless steel 2-liter beaker, 120 grams of NaOH (97% pure) were dissolved in 150 ml. of boiled demineralized water. Then, 150 grams of gibbsite (R-5003F) were added and the temperature of the slurry was raised to boiling. After 15 minutes, a clear solution of sodium aluminate was obtained. This solution was diluted to a volume of 1.5 liters and vacuum filtered through #52 Whatman paper to remove colloidal iron.

The filter was washed with boiled demineralized water and the washings were added to the filtrate. The volume of the filtrate was then brought to 2 liters with boiled demineralized water and cooled to 30° C.

The cooled synthetic sodium aluminate liquor was carbonated by adding $CO_2$ through a polyethylene sparger while vigorously stirring the solution. Since the carbonation system was inefficient, pH was used as a complete control. Within 6 minutes, sufficient $CO_2$ had reacted with the NaOH—$NaALO_2$ to give a pH of 10.0 and carbonation was stopped. The temperature rose to 41° C. during the carbonation step.

The resulting carbonated slurry was vacuum filtered on a 24 cm. Büchner funnel using #576 paper. Three 250 ml. displacement washes of ambient, distilled water were used to remove the mother liquor, and the filter cake was allowed to pull dry.

This filter cake was then reslurried in 2 liters of ambient, distilled water, and aged for 30 minutes. At the end of the 30-minute period, the slurry was vacuum filtered on a 24 cm. Büchner funnel through #576 paper and given two displacement washes of 250 ml. each. The filter cake was then allowed to pull dry and split into two parts, A and B.

Cake "A" was acetone dried and analyzed as follows: $Na_2O$—3.08%; LOI—32.20%; BET surface area—235 m.$^2$/g.; X-ray diffraction—no crystalline phases detected.

Cake "B" was reslurried in 1 liter of 85° C. water and allowed to age for 30 minutes and then filtered and washed as before. This product was acetone dried and analyzed as follows: $Na_2O$—none detected by P-E flame photometer; LOI—20.91%; BET surface area—556 m.$^2$/g.; X-ray diffraction—pattern similar to boehmite; crystallite size—33 A. units.

From the above it is obvious that product "A", as such, is not a product of this invention although the proper precursor material was used. However, product "A" was converted to a product of this invention by the proper treatment. Also, the example vividly shows the exceptional properties developed by the product of this invention when the proper degree of crystallinity has been achieved.

The following Examples 5–7 show the conversion of the products of the invention into well-crystallized boehmite:

EXAMPLE 5

An aged aqueous filter cake was prepared as in Example 1. A small portion of this cake was acetone dried and analyses showed a surface area of 475 m.$^2$/g. with a crystallite size of 33 A. units, and an LOI of 22.15%.

This aqueous filter cake was reslurried in 1 liter of 200° F. distilled water and placed in a constant temperature bath at 200°. The slurry was then aged 24 hours at this temperature while stirring.

At the end of this period, attempts were made to filter the slurry, but were unsuccessful due to the gelatinous, slimy character of the solids. However, a small portion of the solids was isolated and acetone dried. Analyses showed the material to be highly crystalline boehmite with a surface area of about 370 m.$^2$/g., a crystallite size of 60 A. units, and an LOI of 18.18%.

EXAMPLE 6

An acetone dried product was prepared as in Example 1 which analyzed: LOI—21.36%; surface area—493 m.$^2$/g.; crystallite size—35 A. units.

This acetone dried product was repulped in 200° F. distilled water to give 5% solids, and aged in a constant temperature bath at 200° F. for an extended period.

One sample was taken after 24 hours that showed a surface area of 420 m.$^2$/g. and an average crystallize size of about 45 A. units. The LOI was 20.2% and the product filtered reasonably well.

However, after 72 hours of aging at 200° F., the product was almost identical to the one in Example 5. The crystallite size had reached 60 A. units, the surface area was about 395 m.$^2$/g., the LOI was 18.65%, and the product could not be filtered. Well developed boehmite was the only detectable crystalline phase.

EXAMPLE 7

An acetone dried sample was prepared as in Example 1 and repulped in sufficient water to give 10% solids. This slurry was placed in an autoclave.

The temperature was raised to 200° C. within 20 minutes and allowed to remain at 200° C. for 2 hours. At the end of this time, the temperature was lowered to 90° C. within 5 minutes and the autoclave discharged.

The slurry had turned to an opalescent sol which could not readily be filtered. After 3 days sufficient sample was isolated and acetone dried. The product was well crystallized boehmite with an LOI of 17.25% and a surface area of 126 m.$^2$/g. Under static moisture absorption conditions at 10% R.H., only 0.03 g. water adsorbed per 100 g. of sample over a 24-hour period.

EXAMPLE 8

The details are identical to those of Example 1 down through the final acetone displacement wash. At this point the filter cake containing acetone was reslurried in enough fresh acetone to give a 5% solids content. Thirty grams of stearic acid were dissolved in 250 ml. of acetone at 50° C.

The slurry of the product of this invention and the stearic acid solution were mixed together with an osterizer and then filtered. Two displacement washes of 50° C. acetone were used to eliminate excess stearic acid.

The filter cake was then dried at 220° F. for four hours. The dry product was in the form of very soft, easily crushed lumps. These lumps were broken up in an osterizer within 10–20 seconds to give a light fluffy product.

The stearic acid coated material could not be wetted by water and was greasy to the touch. However, no visible melting occurred, nor did the ultra-fine particles tend to stick together even when heated to 135° C., far above the melting point of stearic acid. No stearic acid or aluminum stearate could be detected by X-ray diffraction, but the original alumina hydrate phase was still present.

The final product gave the following analysis: percent stearic acid—28.6%; BET surface area (nitrogen adsorption)—180 m.$^2$/g.

EXAMPLE 9

Same as Example 8, using 2.30 g. stearic acid instead of 30 grams. Analysis of the final product: stearic acid—3.70%; BET surface area—372 m.$^2$/g.; $Na_2O$—none detected.

EXAMPLE 10

The details of this example are identical to Example 1 down through the aging step. The aqueous slurry was vacuum filtered on a 15 cm. Büchner funnel and given a 250 ml. displacement wash with boiling demineralized water. This was followed by a 250 ml. displacement wash of isopropyl alcohol and the cake was allowed to pull dry.

The resulting filter cake was redispersed in 1 liter of isopropyl alcohol, filtered as before and the cake allowed to pull dry. A portion of this cake was then dried for 4 hours at 105° C. which is well above the boiling point of 82.3° C. for isopropyl alcohol.

The dried product analyzed 9.6% isopropyl alcohol with a surface area of 357 m.$^2$/g. Further drying of this rial for 2 hours at 135° C. did not reduce the alcohol content.

EXAMPLE 11

Details of this example are identical to those in Example 10 except normal butanol was used in place of the isopropyl alcohol.

The dried product contained 15.1% n-butyl alcohol with a surface area of 357 m.$^2$/g. Further drying of this product at 70° C. under a high vacuum for 18 hours did not reduce the alcohol content.

EXAMPLE 12

A synthetic liquor was made using potassium instead of sodium hydroxide. An equimolar amount of KOH was used and, therefore, the actual concentration by weight was higher than with the sodium compound.

A sample of 87.5% pure KOH, weighing 185 g., was dissolved in 100 ml. of boiled demineralized water, and then 150 g. of gibbsite (R-5003F) was added. The slurry temperature was raised to boiling and within 20 minutes a clear solution was obtained.

This solution was diluted to a volume of 1.5 liters with boiled demineralized water and vacuum filtered on a 15 cm. Büchner funnel using a #52 Whatman paper to remove colloidal iron. The filter was washed with water and the washings added to the filtrate. The final volume of the filtrate was then brought to 2.0 liters and cooled to 30° C.

Neutralization was accomplished by adding $CO_2$ at such a rate that within 5 minutes a pH of 10.0 was obtained. At this point $CO_2$ addition was stopped. The temperature of the slurry rose to 42° C.

The slurry was then treated as in Example 1 to give an acetone dried product. Yield was 122 g. out of a possible 127 g., or 96%. Analysis of the product was as follows:

| | |
|---|---|
| $K_2O$ | percent__ 0.16 |
| LOI | do____ 23.4 |
| $Al_2O_3$ | do____ 75.4 |
| $SiO_2$ | do____ 0.025 |
| $Fe_2O_3$ | do____ 0.004 |
| Surface area | m.$^2$/g.__ 366 |
| Boehmite content | percent__ 64 |

No other crystalline phases detected by X-rays.

EXAMPLE 13

A commercial American Bayer liquor analyzing 11.60% free soda, 7.2% $Al_2O_3$, 16.88% total soda, and with a specific gravity of 1.242 was diluted by adding 1 pound of water to 1 pound of liquor. This diluted liquor was then carbonated as in Example 1, but to a pH of 11.0. Filtration was rapidly accomplished to remove the mother liquor. Yield of this product was only 70% of theoretical. The washing, aging, and drying were done exactly as in Example 1.

The dried product analyzed as follows:

| | |
|---|---|
| $Na_2O$ | 0.70%. |
| $Al_2O_3$ | 74.4. |
| LOI | 23.5. |
| BET surface area | 398 m.$^2$/g. |
| X-ray pattern | Similar to boehmite with a trace of beta trihydrate. |

EXAMPLE 14

A sample of synthetic sodium aluminate was prepared, according to the procedure outlined in Example 1, containing 60 g.p.l. free soda and an $Al_2O_3$/free soda ratio of 0.65. An acetone dried product was then made as in Example 1. The product analyzed as follows:

$Na_2O$—0.02%
3 hr. 1000° C. LOI—20.74
$Fe_2O_3$—0.007
$SiO_2$—0.015
BET surface area (nitrogen adsorption)—412 m.$^2$/g.
Pore volume—0.560 cc./g.
Boehmite content—90%
X-ray crystallite size—35 A. units
Static moisture absorption 24 hr. equilibrium:
   10% R.H.—5.12 g. $H_2O$/100 g. sample
   80% R.H.—26.35 g. $H_2O$/100 g. sample

EXAMPLE 15

A sample of synthetic sodium aluminate was prepared, according to the procedure outlined in Example 1, containing 100 g.p.l. free soda and an $Al_2O_3$/free soda ratio of 0.65. An acetone dried product was then made as in Example 1. The product analyzed as follows:

$Na_2O$—0.06%
3 hr. 1000° C. LOI—20.99%
$Fe_2O$—0.002
$Si_2O$—0.011
BET surface area (nitrogen adsorption)—455 m.$^2$/g.
Pore volume—0.601 cc./g.
Boehmite content—73%
X-ray crystallite size—32 A. units
Static moisture absorption 24 hr. equilibrium:
   10% R.H.—6.84 g. $H_2O$/100 g. sample
   80% R.H.—36.94 g. $H_2O$/100 g. sample

EXAMPLE 16

A sample of spray dried material was made as in Example 2. This product was dried three days at 100° C. The BET surface area was 349 m.$^2$/g., the pore volume was 0.349 cc./g., and the product had a crystallite size of 28 A. units. The static moisture absorption, at 24 hour equilibrium, was 6.19% at 10% R.H. and 28.10% at 80% R.H.

Portions of this product were activated in thin beds for 2 to 2½ hours at various temperatures and the static moisture absorption determined. The results of these tests were as follows:

| Activation Temperature, ° C. | BET Surface Area m.$^2$/g. | Activation Time (Hours) | LOI (percent) | Equilibrium Moisture Pickup at 10% RH (g. $H_2O$/100 g. sample) 24 Hr. Equilibrium | Equilibrium Moisture Pickup at 80% RH (g. $H_2O$/100 g. sample) 24 Hr. Equilibrium |
|---|---|---|---|---|---|
| 100 | 349 | 72 | 22.5 | 6.19 | 28.10 |
| 260 | 439 | 2 | 13.7 | 10.97 | 39.30 |
| 360 | 365 | 2½ | 7.3 | 10.26 | 41.00 |
| 485 | 427 | 2 | 3.8 | 10.40 | 40.20 |
| 770 | 293 | 2 | 1.7 | 8.46 | 32.36 |
| 910 | 207 | 2 | 1.9 | 4.97 | 23.12 |
| 1,000 | 190 | 2½ | 0 | 3.91 | 14.12 |

EXAMPLE 17

Fifteen parts by volume, based on the solids content, of an aqueous filter cake as obtained in Example 1 were diluted with sufficient distilled water to give an easily pourable mass. This slurry was then slowly added to 100 parts by volume, based on dry polymer content, of SBR-1500 latex while good agitation was maintained.

After about 2 minutes, a thickening of the slurry was apparent and essentially complete coagulation of the polymer was accomplished. The coprecipitate of the product of this invention and the SBR-1500 was then drained on cheesecloth and dried overnight at 150° F. in a circulating air dryer.

The dried coprecipitate was then washed by standard procedures to determine the filler content. Analysis showed the coprecipitate to have an alumina content of 33.4 parts by weight per 100 parts by weight of polymer. This represents greater than 90% recovery of the solid polymer from the latex suspension.

EXAMPLE 18

An acetone dried product as prepared in Example 1 was dry milled into SBR-1500 latex using the following recipe:

| Ingredients: | Parts by weight |
|---|---|
| SBR-1500 | 100 |
| Acetone dried product | 65 |
| Zinc oxide | 5 |
| Stearic acid | 3 |
| Triethanolamine | 1 |
| Sulfur | 3 |
| Benzothiazyl disulfide | 1.25 |
| Tetramethylthiuram disulfide | 0.20 |
| Picco 100 | 10 |

The product of this invention used in the above recipe had an LOI of 22.30% with a BET surface area of 458 m.²/gram.

A control formulation was employed, as follows:

| SBR-1500 recipe: | Parts by weight |
|---|---|
| SBR-1500 | 100 |
| Antioxidant 2246 | 2 |
| Zinc oxide | 5 |
| Stearic acid | 3 |
| Triethanolamine | 1 |
| Sulfur | 3 |
| Benzothiazyl disulfide | 1.25 |
| Di-o-tolylguanidine | 1.75 |
| Picco 100 | 10 |
| Pigment | None |

Physical properties obtained from the vulcanizates of the above-mentioned recipes were compared as follows:

| Polymer | Cure Minutes at 287° F. | 300% Modulus (p.s.i.) | Tensile Strength (p.s.i.) | Elongation (percent) | Hardness Shore A-2 | Tear Strength, lb./in. |
|---|---|---|---|---|---|---|
| SBR-1500 | 30 | | 220 | 240 | 54 | 100 |
|  | 60 | | 270 | 210 | 54 | 80 |
| SBR-1500 plus Product of Invention | 30 | 1,800 | 2,850 | 450 | 80 | 228 |
|  | 60 | 2,100 | 3,000 | 430 | 80 | 218 |

EXAMPLE 19

A stearic acid coated sample prepared as in Example 9 but containing 2.32% stearic acid was used in the same recipe as outlined in Example 18 for uncoated alumina hydrate. The results were as follows:

| | Cure Minutes at 287° F. | 300% Modulus (p.s.i.) | Elongation (percent) | Hardness Shore A-2 | Tear Strength, lb./in. |
|---|---|---|---|---|---|
| SBR-1500 plus Product of Invention | 30 | 2,830 | 530 | 76 | 222 |
| Coated with 2.32% Stearic Acid | 60 | 2,990 | 500 | 78 | 203 |

In addition, the small amount of stearic acid coating tended to improve the dispersing characteristics of the pigment during its incorporation into the polymer.

While present preferred embodiments of the invention have been illustrated and described, it will be recognized that the invention may be otherwise variously embodied and practiced within the scope of the following claims.

What is claimed is:

1. Alumina hydrate having from 1.4 to 1.6 mols of water per mol of $Al_2O_3$, specific surface area of about 300 to 600 square meters per gram, average crystallite size in the range from 20 to about 40 angstrom units, and an X-ray diffraction pattern wherein the area under the 28.1°, $2\theta$ diffraction peak is from 40 to 90% of the corresponding area for standard boehmite, said hydrate being further characterized by capacity to adsorb water vapor even at low relative humidity and by the ease with which adsorbed water may be desorbed simply by drying at a temperature of 200–220° F.

2. Alumina hydrate substantially free of soda contamination, having from 1.4 to 1.6 mols of water per mol of $Al_2O_3$, specific surface area of about 300 to 600 square meters per gram, average crystallite size in the range from 20 to about 40 angstrom units, and an X-ray diffraction pattern wherein the area under the 28.1°, $2\theta$ diffraction peak is from 40 to 90% of the corresponding area for standard boehmite, said hydrate being further characterized by capacity to adsorb water vapor even at low relative humidity and by the ease with which adsorbed water may be desorbed simply by drying at a temperature of 200–220° F., said hydrate upon thermal decomposition in the presence of water producing well-crystallized alpha alumina monohydrate having specific surface area in the order of 100 to 200 sq. m./g. and crystallite size in excess of 60 angstrom units.

3. The method of producing alumina hydrate having from 1.4 to 1.6 mols of water per mol of $Al_2O_3$, an average crystallite size in the range from 20 to about 40 angstrom units, and exhibiting an X-ray diffraction pattern wherein the area under the 28.1°, $2\theta$ diffraction peak is from 40% to 90% of the corresponding area for boehmite, which comprises the steps of (a) precipitating amorphous aluminum hydroxide substantially free of crystalline alumina hydrate by reacting alkali metal aluminate solution having a total alkali content below about 200 g.p.l. alkali metal carbonate with at least an approximately stoichiometric amount of a mineral acid, at a rate such that the precipitation of aluminum hydroxide is substantially completed by neutralization instead of by hydrolysis of the alkali metal aluminate at pH between about 10 and 11 within a period of about 2–20 minutes, while maintaining the reaction temperature between about 25° and about 60° C.; (b) separating the precipitate from the mother liquor, washing and reslurrying the precipitate in an aqueous medium so that the precipitate is fully dispersed, while maintaining the amorphous condition thereof; and (c) aging the slurried precipitate at a pH between about 8 and about 9 at a temperature below about 100° C. for a period between about 5 and about 90 minutes to convert the amorphous aluminum hydroxide into crystalline alumina hydrate having the aforementioned characteristics.

4. The method of producing alumina hydrate having from 1.4 to 1.6 mols of water per mol of $Al_2O_3$, an average crystallite size in the range from 20 to about 40 angstrom units, and exhibiting an X-ray diffraction pattern wherein the area under the 28.1°, $2\theta$ diffraction peak is from 40% to 90% of the corresponding area for boehmite, which comprises the steps of (a) precipitating amorphous aluminum hydroxide substantially free of crystalline alumina hydrate by reacting sodium aluminate solution having a total soda content below about 200 g.p.l. $Na_2CO_3$ with at least an approximately stoichiometric amount of a mineral acid, at a rate such that the precipitation of aluminum hydroxide is substantially completed by neutralization instead of by hydrolysis of the sodium aluminate at pH between about 10 and 11 within a period of about 2–20 minutes, while maintaining the reaction temperature between about 25° and about 60° C.; (b) separating the precipitate from the mother liquor, washing and reslurrying the precipitate in water so that the precipitate is fully dispersed, while maintaining the amorphous condition thereof; and (c) aging the slurried precipitate at a pH between about 8 and about 9 at a temperature below about 100° C. for a period between about 5 and about 90 minutes to convert the amorphous aluminum hydroxide into crystalline alumina hydrate having the aforementioned characteristics (d) filtering the aged slurry; and (e) washing and drying the resulting filter cake.

5. The method of claim 4 in which the sodium aluminate solution is stabilized by a content of soluble silica in a concentration of about 0.2 to about 1.0 gram of $SiO_2$ per liter of solution.

6. The method of producing alumina hydrate having from 1.4 to 1.6 mols of water per mol of $Al_2O_3$, an average crystallite size in the range from 20 to about 40 angstrom units, and exhibiting an X-ray diffraction pattern wherein the area under the 28.1°, $2\theta$ diffraction peak is from 40% to 90% of the corresponding area for bohemite, which comprises the steps of (a) precipitating amorphous aluminum hydroxide substantially free of crystalline alumina hydrate by reacting sodium aluminate solution having a total soda content below about 200 g.p.l. $Na_2CO_3$ with an approximately stoichiometric amount of carbon dioxide, at a rate such that the precipitation of aluminum hydroxide is substantially completed by neutralization instead of by hydrolysis of the sodium aluminate at pH between about 10 and 11 within a period of about 2–20 minutes, while maintaining the reaction temperature between about 25° and about 60° C.; (b) separating the precipitate from the mother liquor, washing and reslurrying the precipitate in water so that the precipitate is fully dispersed, while maintaining the amorphous condition thereof; and (c) aging the slurried precipitate at a pH between about 8 and about 9 at a temperature below about 100° C. for a period between about 5 and about 90 minutes to convert the amorphous aluminum hydroxide into crystalline alumina hydrate having the aforementioned characteristics.

7. The method of claim 6 in which the sodium aluminate solution has a ratio of $Al_2O_3$ to free soda from about 0.5:1 to 0.7:1.

References Cited by the Examiner

UNITED STATES PATENTS

| | | | |
|---|---|---|---|
| 1,953,201 | 4/1934 | Tosterud | 23—143 |
| 2,165,187 | 7/1939 | Wilson et al. | 23—52 |
| 2,247,624 | 7/1941 | Wall | 23—143 |
| 2,377,547 | 6/1954 | Fuchs | 23—143 |
| 2,549,549 | 4/1951 | Wall | 23—143 |
| 2,659,660 | 11/1953 | Sable | 23—143 |
| 2,874,130 | 2/1959 | Keith | 23—143 X |
| 2,881,051 | 4/1959 | Pingard | 23—143 |
| 2,894,898 | 7/1959 | Oettinger et al. | 23—143 X |
| 2,898,307 | 8/1959 | Keith | 23—143 X |
| 2,913,400 | 11/1959 | Burton et al. | 23—143 X |
| 2,915,475 | 12/1959 | Bugosh | 23—143 X |
| 2,973,245 | 2/1961 | Teter et al. | 23—143 |
| 3,031,418 | 4/1962 | Bugosh | 23—143 X |
| 3,151,939 | 10/1964 | Kehl et al. | 23—143 |
| 3,151,940 | 10/1964 | Kehl et al. | 23—143 |
| 3,188,174 | 6/1965 | Kehl et al. | 23—143 |

OSCAR R. VERTIZ, *Primary Examiner.*

MAURICE A. BRINDISI, BENJAMIN HENKIN,
*Examiners.*

H. T. CARTER, *Assistant Examiner.*